United States Patent
Doms

(10) Patent No.: US 11,449,493 B2
(45) Date of Patent: Sep. 20, 2022

(54) PERSISTENT AND CONFIGURABLE MULTIDIMENSIONAL DATA CONSTRAINTS

(71) Applicant: SAP SE, Walldorf (DE)

(72) Inventor: Andreas Doms, Dresden (DE)

(73) Assignee: SAP SE, Walldorf (DE)

( * ) Notice: Subject to any disclaimer, the term of this patent is extended or adjusted under 35 U.S.C. 154(b) by 200 days.

(21) Appl. No.: 16/536,196

(22) Filed: Aug. 8, 2019

(65) Prior Publication Data
US 2021/0042289 A1     Feb. 11, 2021

(51) Int. Cl.
  *G06F 16/23*     (2019.01)
  *G06F 16/28*     (2019.01)

(52) U.S. Cl.
  CPC ........ *G06F 16/2365* (2019.01); *G06F 16/283* (2019.01)

(58) Field of Classification Search
  None
  See application file for complete search history.

(56) References Cited

U.S. PATENT DOCUMENTS

| | | | | |
|---|---|---|---|---|
| 5,339,410 | A * | 8/1994 | Kanai ...................... | G06F 40/18 |
| 5,799,295 | A * | 8/1998 | Nagai ...................... | G06F 40/18 706/45 |
| 5,918,232 | A * | 6/1999 | Pouschine ............. | G06F 16/283 |
| 9,118,153 | B2 | 8/2015 | Doms | |
| 9,465,590 | B2 | 10/2016 | Ivanov et al. | |
| 9,535,935 | B2 | 1/2017 | Doms | |
| 9,870,569 | B2 | 1/2018 | Doms | |
| 10,089,589 | B2 | 10/2018 | Doms | |
| 10,311,035 | B2 | 6/2019 | Doms | |
| 10,318,627 | B2 | 6/2019 | Doms | |
| 2006/0048044 | A1 * | 3/2006 | Genesereth ............. | G06F 40/18 715/213 |
| 2009/0292730 | A1 * | 11/2009 | Li ......................... | G06F 16/283 |

(Continued)

FOREIGN PATENT DOCUMENTS

WO   WO-2008107665 A2 *  9/2008  ............. G06F 40/18

OTHER PUBLICATIONS

Stadelmann. "A Spreadsheet Based on Constraints". ACM 0-89791-628-X/93/0011. 1993. URL Link: <https://dl.acm.org/doi/pdf/10.1145/168642.168664>. Accessed May 2022. (Year: 1993).*

(Continued)

*Primary Examiner* — Irene Baker
(74) *Attorney, Agent, or Firm* — Klarquist Sparkman, LLP

(57) ABSTRACT

Constraint association, constraint persistence, and constraint execution is provided herein. Constraints can be associated with one or more cells in a datacube. The constraints can be stored or persisted with the datacube or in association with the datacube. The constraints can include rules, limitations, or functions determining the set or scope of possible values for the associated cells. The constraints can be applied to the cells when first associated, or when a constraint trigger is received or performed, such as a change to the value of an associated cell. Constraint execution can cascade to additional cells not directly associated with the constraint, and can invoke additional constraints in the cascade. Constraints can include configured constraints, associated to cells by a user via a constraints menu. Constraints can include data model constraints based on a data model for the datacube. Constraints can include default constraints applied during constraint execution.

16 Claims, 13 Drawing Sheets

(56) References Cited

U.S. PATENT DOCUMENTS

| | | | |
|---|---|---|---|
| 2014/0279833 A1* | 9/2014 | Gong | G06F 16/254 |
| | | | 707/602 |
| 2015/0015404 A1 | 1/2015 | Dom | |
| 2015/0095752 A1* | 4/2015 | Studer | G06F 40/177 |
| | | | 715/212 |
| 2015/0161181 A1 | 6/2015 | Doms | |
| 2015/0170176 A1 | 6/2015 | Doms | |
| 2015/0178625 A1* | 6/2015 | Berlandier | G06Q 10/067 |
| | | | 706/11 |
| 2016/0004516 A1 | 1/2016 | Ivanov et al. | |
| 2016/0217401 A1* | 7/2016 | Leung | G06Q 10/06311 |
| 2016/0224920 A1 | 8/2016 | Doms | |
| 2017/0139892 A1 | 5/2017 | Doms | |
| 2017/0177173 A1 | 6/2017 | Doms | |

OTHER PUBLICATIONS

Sample et al. "Augmenting spreadsheets with constraint satisfaction". IEEE CCECE 2011. 978-1-2422-9789-8/11. 2011. URL Link: <https://ieeexplore.ieee.org/stamp/stamp.jsp?tp=&arnumber=6030616>. Accessed May 2022. (Year: 2011).*

Maalerud, "Introduction to Data Models in SAP Analytics Cloud," *SAP Analytics Cloud*, available at: https://www.sapanalytics.cloud/resources-data-modeling/, 7 pages, retrieved on Jul. 24, 2019.

Maalerud, "Spreading, Distributing, and Assigning—Core Planning Functions in SAP Analytics Cloud," *SAP Analytics*, available at: https://www.sapanalytics.cloud/resources-spreading-and-distribution/, 4 pages, retrieved on Jul. 24, 2019.

"Product," *SAP Analytics Cloud*, available at: https://www.sapanalytics.cloud/product/, 16 pages, retrieved on Jul. 24, 2019.

"SAP Analytics Cloud Connectivity Guidelines," *SAP Community Wiki*, available at: https://wiki.scn.sap.com/wiki/display/-BOC/SAP+Analytics+Cloud+Connectivity+Guidelines, 13 pages, retrieved on Jul. 24, 2019.

"Spreading with Last and Average Aggregation," *SAP Analytics Cloud*, available at: https://help.sap.com/doc/00f68c2e08b941f081002fd3691d86a7/release/en-US/723e5cf3858a40a1831549d159e04e74.html, 1 page, retrieved on Jul. 24, 2019.

* cited by examiner

| Editor | | | | | — □ X |
|---|---|---|---|---|---|
| Region / Year | ⟩⟩ All | ⟩⟩ Region 1 | ⟩⟩ Region 2 | ⟩⟩ Region 3 | ⟩⟩ Region 4 | ⟩⟩ HQ |
| ⟩⟩ All | 504,678,600 | 59,234,807 | 425,992,485 | 19,446,507 | 2,400 | 2,400 |
| ⟩⟩ Year 1 | 175,979,941 | 14,519,995 | 161,459,946 | - | - | - |
| ⟩⟩ Year 2 | 328,578,659 | 44,454,812 | 264,472,539 | 19,446,507 | 2,400 | 2,400 |
| ⟩⟩ Year 3 | - | - | - | - | - | - |
| ⟩⟩ Year 4 | - | - | - | - | - | - |
| ⟩⟩ Year 5 | 120,000 | 60,000 | 60,000 | 0 | 0 | 0 |
| ⟩⟩ Q1 | 0 | 0 | 0 | 0 | 0 | 0 |
| ⟩⟩ Q2 | 0 | 0 | 0 | 0 | 0 | 0 |
| ⟩⟩ Q3 | 60,000 | 30,000 | 30,000 | 0 | 0 | 0 |
| ⟩⟩ Q4 | 60,000 | 30,000 | 30,000 | 0 | 0 | 0 |

⚡ Keep Value
⚡ Keep Ratio
⚡ Keep Sum
⚡ Keep Average
⚡ Keep Min
⚡ Keep Max

FIG. 6A

| Editor | | | | | — □ X |
|---|---|---|---|---|---|
| Region / Year | » All | » Region 1 | » Region 2 | » Region 3 | » Region 4 | » HQ |
| » All | 504,678,600 | 59,234,807 | 425,992,485 | 19,446,507 | 2,400 | 2,400 |
| » Year 1 | 175,979,941 | 14,519,995 | 161,459,946 | - | - | - |
| » Year 2 | 328,578,659 | 44,454,812 | 264,472,539 | - | - | - |
| » Year 3 | - | - | - | - | - | - |
| » Year 4 | - | - | - | - | - | - |
| » Year 5 | 120,000 | 60,000 | 60,000 | - | - | - |
| » Q1 | 0 | 0 | 0 | 0 | 0 | 0 |
| » Q2 | 0 | 0 | 60,000 | 0 | 0 | 0 |
| » Q3 | 60,000 | 60,000 | 30,000 | 0 | 0 | 0 |
| » Q4 | 60,000 | 30,000 | 30,000 | 0 | 0 | 0 |

Keep Value
Keep Ratio
Keep Sum
Keep Average
Keep Min
Keep Max

FIG. 6B

| Editor | | | | | | — ☐ X |
|---|---|---|---|---|---|---|
| Region / Year | » All | » Region 1 | » Region 2 | » Region 3 | » Region 4 | » HQ |
| » All | 504,678,600 | 59,234,807 | 425,992,485 | 19,446,507 | 2,400 | 2,400 |
| » Year 1 | 175,979,941 | 14,519,995 | 161,459,946 | - | - | - |
| » Year 2 | 328,578,659 | 44,454,812 | 264,472,539 | - | - | - |
| » Year 3 | - | - | - | - | - | - |
| » Year 4 | - | - | - | - | - | - |
| » Year 5 | 120,000 | 60,000 | 60,000 —603 | 0 | 0 | 0 |
| » Q1 | 0 | 0 | 0 | 0 | 0 | 0 |
| » Q2 | 0 | 0 | 0 | 0 | 0 | 0 |
| » Q3 | 60,000 | 30,000 | 30,000 | 0 | 0 | 0 |
| » Q4 | 60,000 | 30,000 | 30,000 | 0 | 0 | 0 |

Editor — □ X

| Region / Year | ≫ All | ≫ Region 1 | ≫ Region 2 | ≫ Region 3 | ≫ Region 4 | ≫ HQ |
|---|---|---|---|---|---|---|
| ≫ All | 504,678,600 | 59,234,807 | 425,992,485 | 19,446,507 | 2,400 | 2,400 |
| ≫ Year 1 | 175,979,941 | 14,519,995 | 161,459,946 | - | - | - |
| ≫ Year 2 | 328,578,659 | 44,454,812 | 264,472,539 | 19,446,507 | 2,400 | 2,400 |
| ≫ Year 3 | - | - | - | - | - | - |
| ≫ Year 4 | - | - | - | - | - | - |
| ≫ Year 5 | 120,000 | 60,000 | 60,000 | 0 | 0 | 0 |
| ≫ Q1 | 0 | 0 | 0 | 0 | 0 | 0 |
| ≫ Q2 | 30,000 | 15,000 | 15,000 | 0 | 0 | 0 |
| ≫ Q3 | 45,000 | 22,500 | 22,500 | 0 | 0 | 0 |
| ≫ Q4 | 45,000 | 22,500 | 22,500 | 0 | 0 | 0 |

| Editor | | | | | |
|---|---|---|---|---|---|
| Region / Year | ≫ All | ≫ Region 1 | ≫ Region 2 | ≫ Region 3 | ≫ Region 4 | ≫ HQ |
| ≫ All | 504,678,600 | 59,234,807 | 425,992,485 | 19,446,507 | 2,400 | 2,400 |
| ≫ Year 1 | 175,979,941 | 14,519,995 | 161,459,946 | - | - | - |
| ≫ Year 2 | 328,578,659 | 44,454,812 | 264,472,539 | - | - | - |
| ≫ Year 3 | - | - | - | - | - | - |
| ≫ Year 4 | - | - | - | - | - | - |
| ≫ Year 5 | 120,000 | 60,000 | 60,000 | 0 | 0 | 0 |
| ≫ Q1 | 30,000 | 15,000 | 15,000 | 0 | 0 | 0 |
| ≫ Q2 | 30,000 | 15,000 | 15,000 | 0 | 0 | 0 |
| ≫ Q3 | 30,000 | 15,000 | 15,000 | 0 | 0 | 0 |
| ≫ Q4 | 30,000 | 15,000 | 15,000 | 0 | 0 | 0 |

FIG. 6E

PERSISTENT AND CONFIGURABLE MULTIDIMENSIONAL DATA CONSTRAINTS

BACKGROUND

The amount of data in database and enterprise systems continues to increase at a high pace. In practice, such data is often available to users for planning or analysis, which often involves manipulation of the data. However, data fields often are interrelated, and manipulation of one field may require changes to many other fields. Sometimes these changes should adhere to certain rules; however, enforcement of such rules is currently often done manually. Such manual rule or relationship enforcement generally requires extensive knowledge or expertise by the user, as well as making the process labor-intensive and more error-prone. Thus, there is room for improvement.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method of associating constraints to grid cells is provided herein. A selection of cells can be received. An invocation of a constraints menu can be received. One or more constraints in the menu can be displayed. A selection of a constraint can be received. The selected constraint can be stored in association with the cells of the selection of cells. The constraint can be applied to the cells in the selection of cells.

A method of updating cells in a datacube is provided herein. An action can be executed in a datacube on a cell. A constraint associated with the cell can be detected. A value in the cell can be updated based on the constraint. The updated value can be stored in the cell.

A system for multidimensional datacube management is provided herein, which can perform datacell calculation operations. A first change to a first cell in a multidimensional datacube can be received. A constraint associated with the first cell can be detected. The detected constraint can include a constraint type identifying a constraint function. One or more additional cells associated with the constraint can be detected. A first value for the first cell and one or more additional values for the respective one or more additional cells can be calculated. The first value and the one or more additional values can be calculated based on the constraint associated between the first cell and the one or more additional cells such that the first value and the one or more additional values together satisfy the constraint. The calculating can be based on the constraint and can include executing the constraint function identified by the constraint type of the associated constraint. The first value can be stored in the first cell. The one or more additional values can be stored in their respective one or more additional cells.

The foregoing and other objects, features, and advantages of the invention will become more apparent from the following detailed description, which proceeds with reference to the accompanying figures.

BRIEF DESCRIPTION OF THE DRAWINGS

FIGS. 6A-E are diagrams depicting an example flow associating and applying constraints to cells.

DETAILED DESCRIPTION

Example 1—Overview

Figure 1:
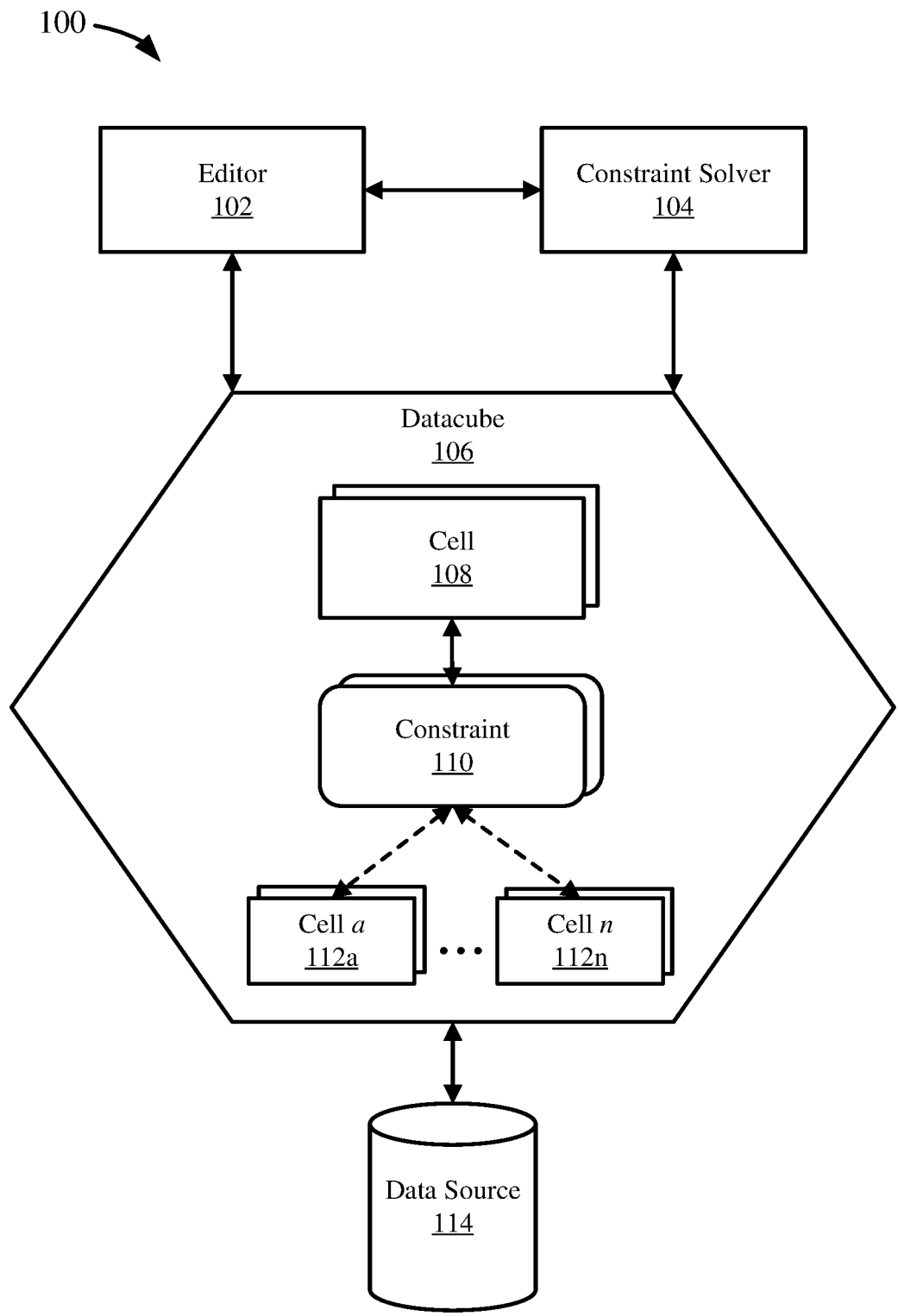
FIG. 1 is a block diagram of an example system implementing constraint persistence and execution functionality.

The ever-increasing amount of incoming data and transformation of the enterprise into a data-driven world creates many difficulties as data is accumulated and analyzed or manipulated. In enterprise planning, users regularly enter or update key figures, such as in budget planning, logistics, or data analysis scenarios. For example, a user can change values in spreadsheet files that are then sent via email to colleagues involved in a planning task. As another example, users can access a collaborative enterprise planning software, which may allow users to enter new or change existing values in multidimension datacubes. Users can work on private versions of a cube visible to themselves, which can be published later, thus the changed values can become the new values for planning or analysis, or can be key performance indicators (KPIs), in the published version of the planning datacube. Example planning operations in a multidimensional cube scenario are: spreading values among children fields of a common parent field, distributing values among sibling fields, or assigning values to fields of a dimension. In such operations, values are adjusted across all dimensions involved, often resulting in thousands of figures changing.

An issue with such data manipulation or use is that each planning domain or data domain often has its own data restrictions or data relationships for its data models. Such data restrictions or relationships often include routine tasks of how to enter or update values to existing members or fields in a consistent manner. Further, specific planning or analytical scenarios bring their own specific constraints as to how values can be changed and affect other values at the same time.

In some cases, these restrictions are hard coded into software and thus cannot be readily changed for different or new scenarios. Often, such hard-coded restrictions are very specific, and so cannot be widely used or broadly applied to different data scenarios. Such hard-coded restrictions can also include individual dialog boxes for execution, which can bring the user out of the context of the data being analyzed, and can even hide the data, preventing a user from seeing the very data with which they are working. Further, not all restrictions are flexible or compatible with new or additional restrictions, such as on the same data. Further, users sometimes seek to apply multiple restrictions to the same, or overlapping, data sets, and such restrictions may not be compatible or may not be aware of each other, and so functionally do not work together, resulting in only the most recent restraint applied.

An example of such a restriction or constraint is that, during the task of spreading values among certain cell values, the sum of the values is intended to remain the same. For example, during budget planning the budgets of the various European departments could be changed, but, regardless of how the distribution along the dimension of departments is changed, the restriction or constraint can be that the sum of all European departments should remain unchanged.

The multidimensional constraint technology described herein can solve these issues by introducing persistent constraints that can be applied and associated to cells or other data members in a multidimensional datacube. This allows users to stay in the context of the data being analyzed, and provides the ability to define arbitrary constraints which can be applied in the context of one or multiple planning operations or other data manipulation operations. Further, multiple constraints can be associated to the same cells, or to related cells, so all constraints applicable to cells can be considered and factored into the cell values. Generally, this can reduce the number of user interactions necessary (e.g. steps taken by a user), while more scenarios can be applied and overlapped in a datacube. Multidimensional constraint technology can include constraint persistence, constraint association, and constraint execution functionality.

Constraint persistence, constraint association, and constraint execution functionality can be provided in data management software, ERP software, data analytics software, or other data manipulation or data editing software systems. An example of such tools is SAP Cloud Analytics™ technology by SAP SE of Walldorf, Germany.

Example 2—Example System that Associates Constraints with Cells and Applies Constraints on Cells FIG. 1 is a block diagram of an example system 100 implementing constraint persistence, association, and execution functionality. An editor 102 can provide data manipulation or data analytics functionality for a data set, such as the datacube 106. The editor 102 can include a user interface for viewing, changing, or otherwise manipulating data in a data set. For example, the editor 102 can be software for viewing and editing a spreadsheet. Further, the editor 102 can access one or more data sources, such as data source 114, to obtain data for viewing, manipulating, or the like. For example, the editor 102 can receive or obtain the datacube 106 from the data source 114.

The datacube 106 can be a multidimensional data set, having multiple data members such as fields or cells 108, 112a-n. The datacube 106 can have data from the data source 114, or be a compilation or aggregation of data from multiple data sources. The datacube 106 can be instance data of a data model or data domain, which can be related or descriptive of a particular planning or problem domain. The cells 108, 112a-n can store the instance data, and can have additional data, such as metadata, associated with them.

One or more constraints 110 can be associated with a cell or set of cells 108 in the datacube 106. The constraints 110 can be persisted or otherwise stored in the datacube 106, or in the data source 114 (or both). The constraints 110 can be associated with one or more additional cells or sets of cells 112a-n. A constraint 110 associated with a cell or a set of cells 108 can be an instance of a constraint. Such an instance of a constraint 110 can be associated with one or more additional individual cells or sets of cells 112a-n.

A constraint solver 104 can provide functionality to execute or otherwise solve one or more constraints 110 in a datacube 106. Executing or solving constraints can include solving a constraint problem to satisfy the one or more constraints, such as my adjusting or otherwise determining the values of the cells associated with the constraints. The constraint solver 104 can execute (e.g. satisfy) a constraint 110 against its associated cells 108, and thereby apply the constraint to the cells and change the values of the cells based at least in part on the function of the constraint. In some embodiments, the constraint solver 104 can be integrated with the editor 102. In other embodiments, the constraint solver 104 can be a separate system or service accessed by the editor 102. In further embodiments, the constraint solver 104 can be triggered by the datacube 106 (e.g. data within the datacube or an action taken on the datacube), and can push constraint solving results (e.g. updated cell values) to the editor 102.

In practice, the systems shown herein, such as system 100, can vary in complexity, with additional functionality, more complex components, and the like. For example, there can be additional functionality within the constraint 110, the editor 102, or the constraint solver 104. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

The system 100 and any of the other systems described herein can be implemented in conjunction with any of the hardware components described herein, such as the computing systems described below (e.g., processing units, memory, and the like). In any of the examples herein, the instructions for implementing the constraint solver 104 or editor 102, the input, output and intermediate data of running the constraint solver 104 or editor 102, or the datacube 106, and the like can be stored in one or more computer-readable storage media or computer-readable storage devices. The technologies described herein can be generic to the specifics of operating systems or hardware and can be applied in any variety of environments to take advantage of the described features.

Figure 2:
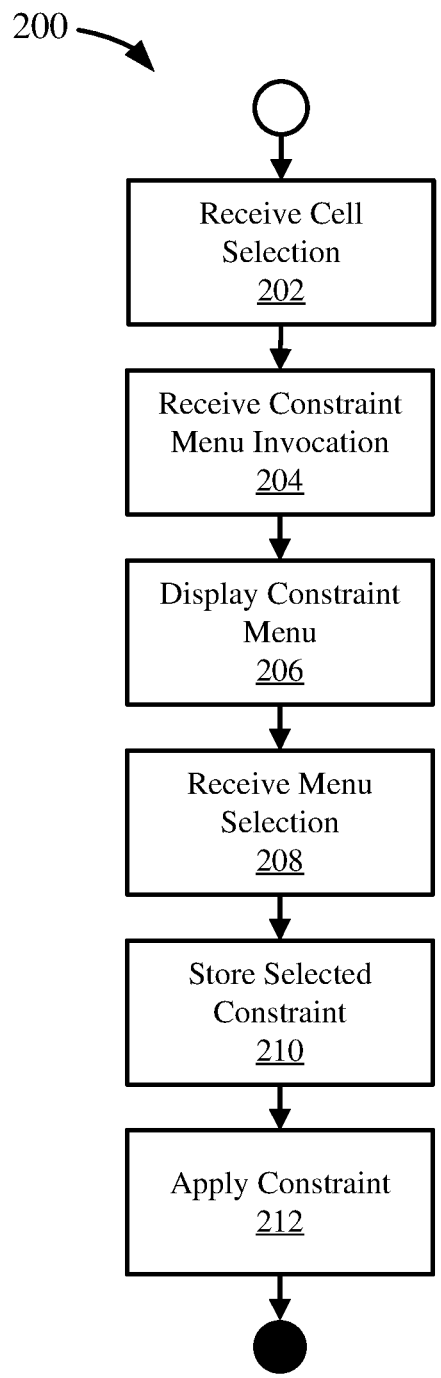
FIG. 2 is a flowchart of an example method of associating a constraint with cells.

Example 3—Example Method that Associates Constraints with Cells and Applies Constraints to Cells FIG. 2 is a flowchart of an example method 200 of associating a constraint with cells and can be implemented, for example, by the system described in FIG. 1.

At 202, a selection of cells can be received. The selection of cells can indicate a set of one or more cells. The selection of cells can include cell identifiers for the cells in the selection, such as cell names, cell dimensions, or cell reference or ID numbers. In some cases, the selected cells can be sequential or otherwise contiguous cells along one or more dimensions for the cells. In other cases, the selected cells can be non-sequential or non-contiguous along all dimensions for the cells (e.g. arbitrary, unrelated cells). In further cases, the cell selection can include multiple groups of sequential or contiguous cells where the groups are not sequential or contiguous, or other partially sequential or contiguous cells.

At 204, a constraint menu invocation can be received. The constraint menu invocation can indicate a type of menu to display or otherwise provide for available constraints. Generally, the received constraint menu invocation can trigger providing a list of constraints available.

At 206, a constraint menu can be displayed. Displaying the constraint menu can be based, at least in part, on the constraint menu invocation received at 204. The constraint menu may be displayed based on one or more factors provided in the menu invocation, such as a display location in a user interface. Displaying the constraint menu can include providing a list of available constraints, which can include providing the list for display in a user interface. Other methods of providing the list of available constraints can be employed at 206, such as providing a programmatic list in a RESTful interface between systems.

At 208, a constraint selection can be received. The constraint selection can be from the available constraints displayed in the menu at 208. The constraint selection generally indicates a single constraints, but in some embodiments can indicate multiple constraints. The constraint selection can include an identifier for the selected constraint, such as a reference or ID number. The constraint selection may be a selection of a type of constraint or a constraint function to associate with (or otherwise relate to) the selection of cells received at 202.

At 210, the selected constraint can be stored. The selected constraint is generally stored in association with the cell selection received at 202. For example, in some embodiments, the constraint identifier received at 208 can be stored in association with each of the selected cells from 202. In other embodiments, a constraint object can be generated at 210, storing identifiers for the selected cells and for the selected constraint, and the constraint object can be stored, and may further be stored in association with the selected cells. The selected constraint can be stored with the datacube of which the selected cells are a part, or can be stored separate from the datacube, such as in a separate file or separate data structure. Storing the constraint may include generating a new constraint object having a constraint type, as selected at 208, and identifiers for the selection of cells received at 202.

At 212, the selected constraint can be applied. Applying the selected constraint can include executing the constraint over the selected cells, which can result in changing the values of the selected cells based on the function of the selected constraint. For example, if the selected constraint is to spread the value of the selected cells evenly, the selected cells may have their values updated to have approximately the same values based on the sum total across the selected cells (e.g. two selected cells having values 60 and 40 can have their values changed to 50 and 50 based on applying the constraint at 212).

Applying the constraint at 212 can include invoking, triggering, or otherwise accessing a constraint solver. In some cases, the constraint selected may not result in different values for the selected cells when applied. For example, a constraint to keep the current values of the selected cells would not change the values of the selected cells when applied at 212. In such cases, applying the constraint at 212 may be skipped. Thus, applying the constraint at 212 may depend on the type of constraint selected (e.g. at 208).

Figure 5:
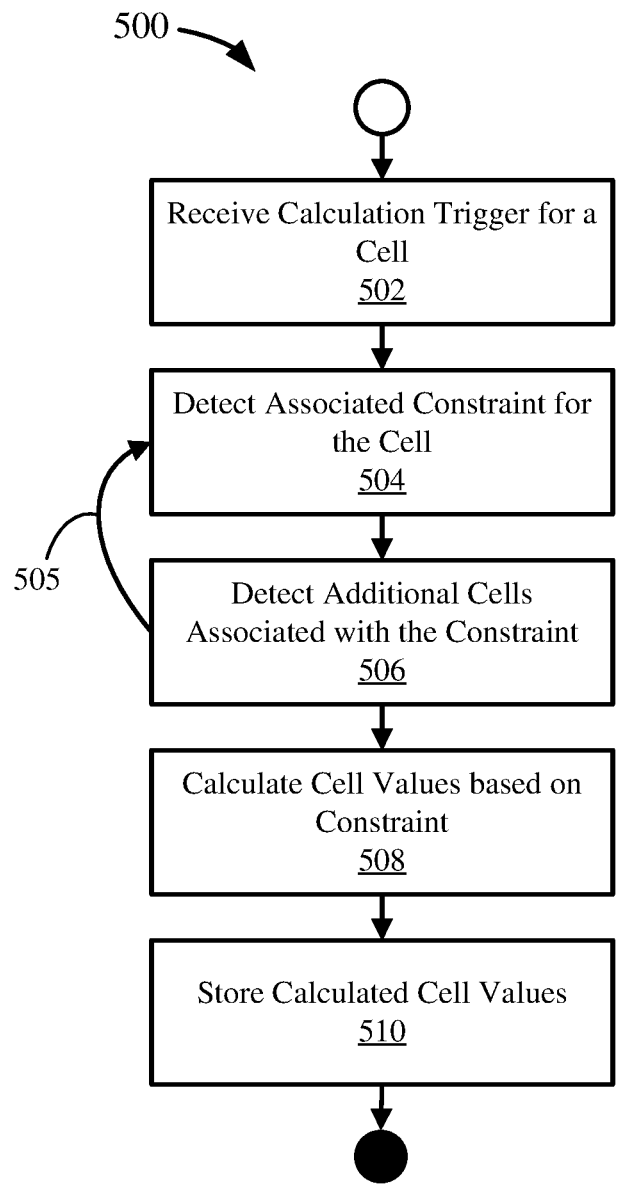
FIG. 5 is an exemplary method of applying constraints to cells.

In some embodiments, the selected constraint can be applied (e.g. at 212) based on process 500 shown in FIG. 5.

For example, the selected constraint can be applied when the associated cells are edited or otherwise changed, as described herein. In some cases, if the constraint(s) cannot be satisfied, the data entry to the associated cells (e.g. changes to values) can be rejected, which can include returning the associated cells to their pre-change or original values and/or providing a message to a user indicating the inability to satisfy the constraint(s).

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "receive" can also be described as "send" from a different perspective.

Example 4—Example Constraint Menu Invocation

In any of the examples herein, the constraint menu can be configured to be invoked in a variety of ways. For example, a special user interface activation (e.g., right click, control click, gesture, or the like) can be used to invoke the constraint menu. Such invocation can be made when the current user interface context indicates a location at which the constraint is to be applied (e.g., the cell or cells are selected and the activation takes place within the cells).

Example 5—Example Association Between Constraints and Cells

Figure 3:
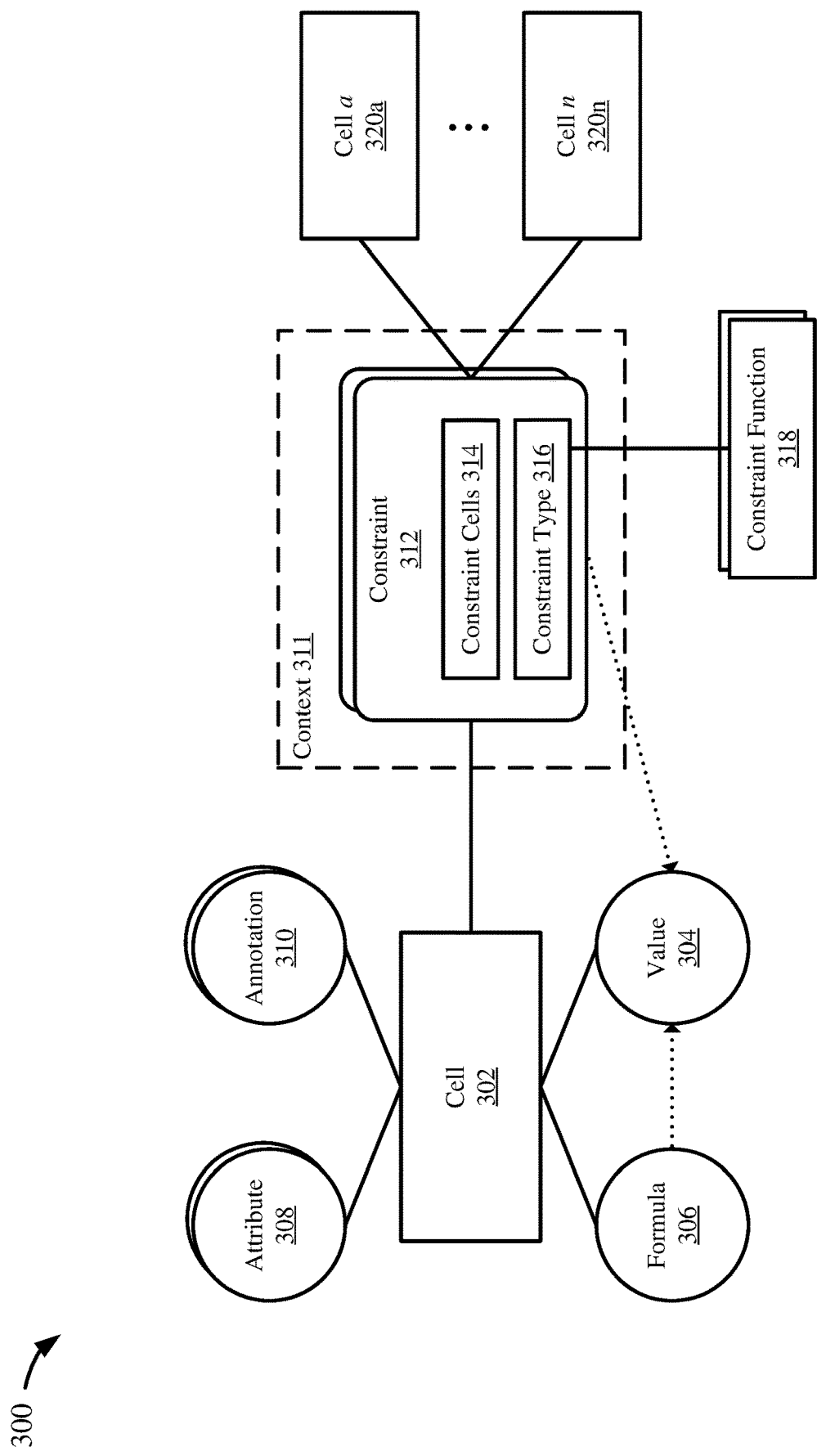
FIG. 3 is an exemplary cell-constraint association.

FIG. 3 is a block diagram of an example cell-constraint association representation 300. In any of the examples herein, a cell can be associated with one or more constraints. In any of the examples herein, a constraint can be associated with one or more cells or sets of cells.

A cell 302 can have one or more attributes, such as a value 304, a formula 306, one or more attributes 308, or one or more annotations 310 (or combinations thereof). The cell can be defined by one or more dimensions in a data set. The value 304 of a cell can be instance data for the position of the one or more dimensions defining the cell in the data set. The formula 306 can be a function, algorithm, or equation, or the like, that determines the value 304 of the cell 302. The attributes 308 of the cell 302 can be data settings defining the cell, such as cell type (e.g. the type of data stored in the cell as the value 304, such as numeric, text, etc.), or aspects of the cell, such as cell color (e.g. background color, text color), font, formatting for display of data in the cell, and the like. The annotations 310 of the cell 302 can be metadata for the cell, such as user notes or other tags on the cell.

The cell 302 can be associated with a constraint 312, or multiple constraints. The constraint 312 can, in part, determine the value 304 of the cell 302 with which it is associated. The constraint 312 can include identifiers for the cells associated with the constraint 314. For example, the constraint 312 can store a set of cell IDs indicating a set of cells 314 over which the constraint applies. In some embodiments, the constraint cells 314 can contain a set of cells 302, 320a-n to which the constraint 312 applies, and the constraint can contain multiple constraint cell sets 314 for separate sets of cells to which the constraint applies separately.

An association between a cell 302 and a constraint 312 can be implemented or represented as mutual pointers stored with each. That is, the cell 302 can have a pointer or other reference to the constraint 312, such as the constraint identifier, and the constraint can have a pointer or other reference to the cell, such as the cell identifier.

The constraint 312 can be associated with additional cells 320a-n. The additional associated cells 320a-n can be cells the constraint 312 applies to in association with the cell 302. Additionally or alternatively, the additional cells 320a-n can be one or more sets of cells to which the constraint 312 applies separately.

The constraint 312 can include a constraint type 316 indicating the type of the constraint. The constraint type 316 can be an identifier for a constraint function 318. The constraint function 318 can be the equation, algorithm, or other functional description of the constraint 312. For example, the constraint function 318 can be a programming method or function which can be called to perform the function of the constraint 312 on the associated cells 302, 320a-n (e.g. such as can be available in a library). In some embodiments, the constraint type 316 can be the constraint function 318, stored within the constraint 316.

The constraint 312 can be stored in association with a context 311. The context 311 can be based on the constraint 312, the cell 302 or cells 302, 320a-n with which the constraint is associated, or otherwise based on the datacube for the cells (or a combination thereof).

In any of the examples herein, the constraint 312 can be stored or related to the cell 302 as an attribute 308 or property of the cell (e.g., property "constraint"=constraint identifier or the like). In such cases, constraints 312 can be tightly coupled to their associated cells 302, 320a-n. In other embodiments, the constraint 312 can be stored separately from its associated cells 302, 320a-n, such as in a separate data structure or file, which may point to or otherwise indicate the associated cells (and the associated cells may similarly point to or otherwise indicate the associated constraint). In such cases, the constraints 312 can be loosely coupled to their associated cells 302, 320a-n.

A cell 302 can have one or more constraint identifiers stored with it, as attributes 308 for example, which indicate the constraints associated with the cell, similar to the constraint cells 314 in the constraint 312.

Example 6—Example System that Executes Constraints on Cells

Figure 4:
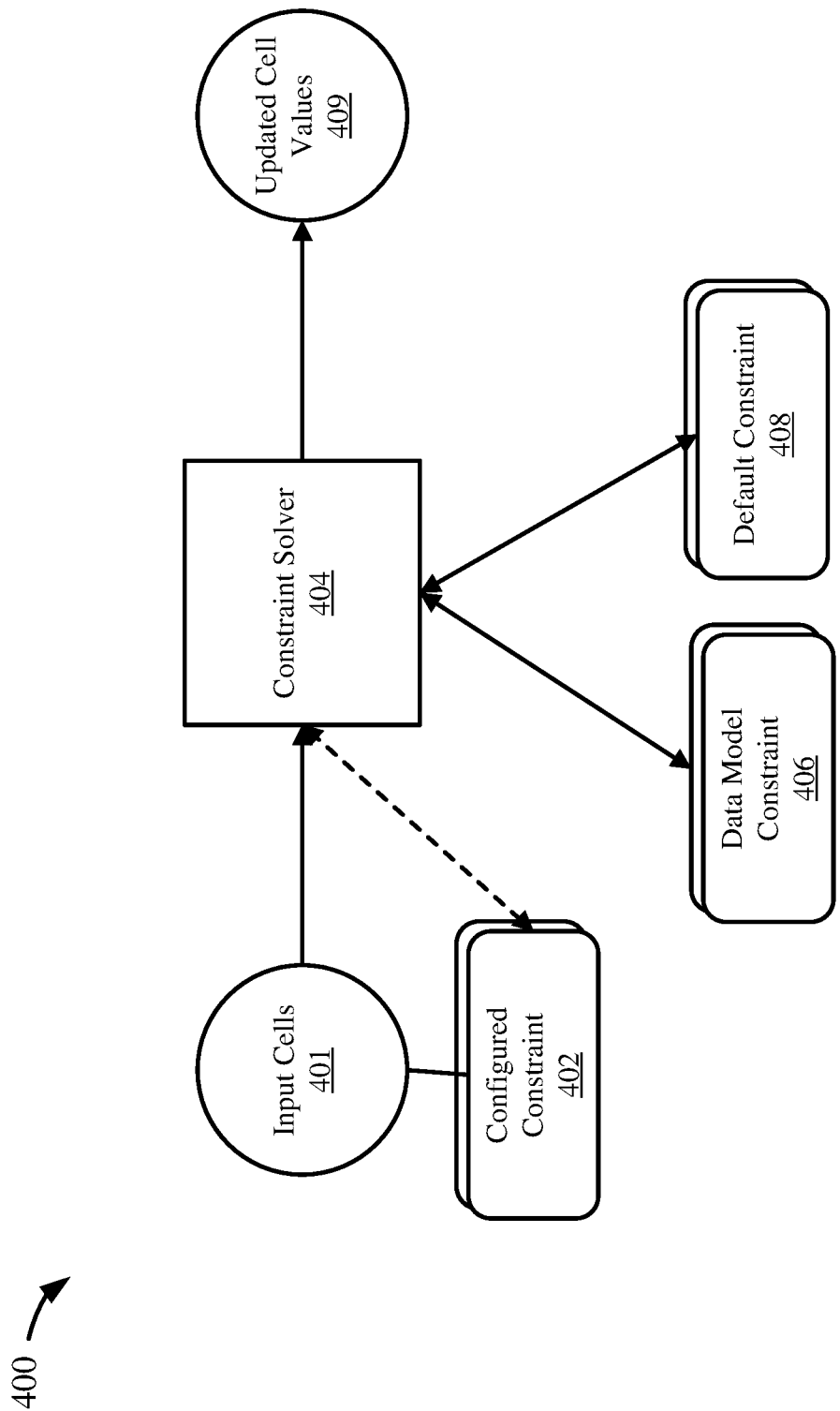
FIG. 4 is an exemplary system implementing constraint execution.

FIG. 4 is a block diagram of an example system 400 implementing constraint execution. A constraint solver 404 can receive one or more input cells 401. The input cells 401 can be associated with one or more configured constraints 402. In some embodiments, the constraint solver 404 may access or obtain the configured constraints 402 based on associations identified from the input cells 401. In other embodiments, the configured constraints 402 can be received as part of the input cells 401. In other embodiments, the configured constraints 402 can be received along with the input cells 401.

The constraint solver 404 can execute the constraint function of the configured constraint 402, or all constraint functions if multiple constraints are associated with the input cells 401, to calculate or otherwise determine the updated cell values 409 for the input cells. The constraint solver 404 can calculate the updated cell values 409 based on the values of the input cells 401, or formulas for one or more of the input cells, and the configured constraints 402.

In some cases, a data model of which the input cells 401 are a part may provide additional data model constraints 406 for the input cells. The constraint solver 404 can access one or more data model constraints 406 to apply to the input cells 401 as part of executing the configured constraints 406.

In some cases, a constraint solver 404 can access one or more default constraints 408. The default constraints 408 may be general constraints that apply to the input cells 401 but are not uniquely configured to be associated with the input cells (e.g. not associated by a user). For example, default constraints 408 may be constraint types/functions that are known or otherwise available to a constraint solver 404, which the constraint solver can add on-the-fly to received input cells 401 or received configured constraints 402. The default constraints 408 may be stored in a default constraint vault, which may be part of the constraint solver 404 or accessible by the constraint solver to obtain additional constraints to add to configured constraints 402 during processing (e.g. constraint solving). In some cases, default constraints 408 may have similar or overlapping types as the configured constraints 402 or the data model constraints 406; in other cases, the default constraints may be unique and not available as configured or data model constraints. Generally, a default constraint 408 can be a constraint of any type that a constraint solver 404 can add to processing (e.g. before processing, after processing results in multiple solutions, or during processing) of one or more configured constraints 402 and/or data model constraints 406.

Default constraints 408 can be used to ensure a single solution to the updated cell values calculated by the constraint solver 404. In some scenarios, a constraint solver 404 may determine that there are multiple possible sets of updated cell values 409 when the configured constraints 402 and data model constraints 406 are applied. Default constraints 408 can then be included by the constraint solver 404 in execution of the constraints 402, 406. Additional default constraints 408 can be added in the constraint solver 404 until a single solution (e.g. set of updated cell values 409) is calculated. If all default constraints 408 are executed and a single solution still is not calculated, solution ranking or heuristics, or other choice select such as first set calculated, can be used to select a set of updated cell values 409 for the input cells 401.

Example 7—Example Method that Executes Constraints on Cells

FIG. 5 is a flowchart of an example method 500 of applying constraints to cells and can be implemented, for example, by the system described in FIG. 4 or FIG. 1.

At 502, a trigger for calculating or recalculating a cell can be received. The trigger can include an identifier of the cell to be calculated. The trigger can identify multiple cells to be calculated. In some cases, the trigger can indicate a context or other metastructure which is associated with one or more cells for which its members (e.g. associated cells) are to be calculated.

At 504, a constraint associated with the cell can be detected. The constraint detected can be a configured constraint, as described herein. The constraint can be detected from the cell, which can have a constraint indicator, such as a pointer or identifier for the constraint. Alternatively or additionally, the constraint can be detected by searching the stored constraints for constraints with the cell's identifier.

At 506, additional cells also associated with the constraint can be detected. Detecting the additional cells can include analyzing the constraint to determine any additional cell identifiers stored with the constraint (and that are in the same set as the cell that was triggered). Alternatively or additionally, the other cells in the datacube can be searched for an association with the same constraint.

In some embodiments, the additional cells detected at 506 can be returned at 505 to step 504 to also be analyzed for further constraints associated with the additional cells. If additional constraints are associated with one or more of the additional cells, further cells may be detected for these additional constraints at 506. This process 505 may be repeated until all associated cells and constraints are identified.

At 508, cell values (or updated cell values) can be calculated based, at least in part, on the constraint or constraints. Calculating the cell values using the constraints can include linear or constraint calculations. In some cases, data model constraints or default constraints, or both, can be introduced and executed along with the detected constraints (e.g. configured constraints). Calculating the cell values can include using the previous cell values, or formulas for the cells, and the constraint functions of the constraints applied to the previous cell values or formulas.

At 510, the calculated cell values can be stored in their respective cells. Generally, storing the calculated cell values includes changing the value in the cell to the updated cell value, repeated for each of the cells with a new cell value. Generally, cell value changes can be accomplished in a transactional manner.

The method 500 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "receive" can also be described as "send" from a different perspective.

Example 8—Example Illustrating the Process of Associating an Executing Constraints on Cells FIGS. 6A-E are example user interface displays depicting an example flow associating and applying constraints to cells 600. The example 600 depicts a datacube having dimensions "Region," "Sub-Region" (shown by Region arrows), "Year," and "Quarter," where Quarter can be a sub-dimension of Year and Sub-Region can be a sub-dimension of Region. Cells store values for the specific values of the dimensions. For example, "Region 1" and "Year 1" has a cell with a value 14,519,995, which can indicate a number of units produced, or units processed, value of invoices, or the like.

In FIG. 6A, a selection of cells 601 can be indicated or made, such as by a user. Referencing the selection 601, a constraint menu 602a can be invoked, such as by a mouse click or keyboard command by a user. The constraint menu 602a can display the available constraints for associating to the selected cells 601. A constraint can then be selected from the constraint menu 602a for association with the selected cells 601. For example, the "Keep Value" constraint can be selected from the constraint menu 602a and associated to the selected cells 601.

In FIG. 6B, the first constraint (e.g. "Keep Value") has been associated with the selected cells 601, which can be indicated by an icon 603. The constraint indicator 603 can indicate that one or more constraints are associated with the cells. Alternatively or additionally, the constraint indicator 603 can represent that a particular type of constraint (e.g. the "Keep Value" constraint) is associated with the cells. That is, each type of constraint can have a separate indicator (e.g. 603). Further, a constraint indicator (e.g. 603) can indicate a particular instance of a constraint, such that separate constraints applied to separate sets of cells but having the same type can have different, or partially different, indicators.

In FIG. 6B, a second selection of cells 605 can be indicated or made, similar to the first selection 601. Referencing the second selection 605, a constraint menu 602b can be invoked and displayed, which can be the same constraint menu 602a as for the first selection of cells 601. A constraint can be selected from the constraint menu 602b for the second selection of cells 605. For example, the "Keep Sum" constraint can be selected for the selected cells 605.

FIG. 6C illustrates two constraints 603, 607 associated with the two separate sets of cells. In other scenarios, the configured constraints 603, 607 can overlap or otherwise be co-extensive in their associated cells. Further, the effects of the constraints 603, 607 may overlap or cascade to separate or common cells in the example 600, which can be cells not directly associated with the constraints. That is, a configured constraint 603, 607 can affect cell values for cells not directly associated with the configured constraint.

In FIG. 6D, a cell can be selected 609 (or other receive the system focus) and can be changed, such as from 0 to 30,000 in this example 600. Changing the value of the selected cell 609 can trigger constraint 607, as the selected cell is associated with the "Keep Sum" constraint 607. Thus, constraint 607 can be executed and hence applied to its associated cells, which can result in changes to the "All:Q3" and "All:Q4" cells 612 to 45,000 from 60,000. Thus, the "Keep Sum" constraint 607 can be solved across its associated cells. Executing this constraint 607 can include executing additional data model or default constraints, such as keeping the associated cell "All:Q1" at zero, and keeping the ratio between the "All:Q3" and "All:Q4" cells 612.

Further, the change to the selected cell 609 can cascade to related cells 610 based on the relationship between the cells. Specifically, changed cell 609 is the cell for "All Regions" (in Q2), and so the specific regions should have values that sum to the total for All Regions based on the data model ("HQ" may be excluded from this relationship in the data model). Thus, the total 30,000 for changed cell 609 cascades to the cells for the specific regions, which then invokes constraint 603 because that constraint is associated with the specific regions for the applicable year (Year 5).

Further, the cascaded changes to cells 612 and cells 610 also cascade to cells 614 and cells 616. These additional cascade cells 614, 616 are also affected by the constraints 603, 607, while not being directly associated to them. Processing the changes to the selected cell 609 and the further cells 610 and 612 with the applied constraints 603, 607 can lead to cells 614 being changed to 22,500 and cells 616 being changed also to 22,500. This processing can include data model constraints, such as to keep Region 1 and Region 2 totaling to the All value for Q3, or default constraints, such as to keep semi-manually changed cells like cells 610 with their updated values.

In practice, a constraint solver can receive the changed cell 609, the associated constraint 607 and the additional cells associated with that constraint (such as cells 612) as input to solve the constraint. Further, the constraint solver can receive as input or detect the other related cells 610 (e.g. from the data model) and their associated constraint 603, and their further related cells 614, 616, which can also be used in solving the constraints and calculating the updated cell values.

FIG. 6E continues the example 600 with a change to cell 618, from 0 to 30,000, and the resulting changes to the other cells related through the constraints 603, 607 and the data model. A default constraint, such as to keep ratios even, can be used to generate the resulting equal values balanced between the impacted cells.

Example 9—Example Datacube

In any of the examples herein, a datacube can be a data set defined by one or more dimensions. A dimension can have one or more relationships with one or more other dimensions, allowing the dimensions to be interrelated. The dimensions and their relationships can be defined by a data model or schema.

The dimensions, or the members in the dimensions, can be arranged in a hierarchy, or in multiple separate or overlapping hierarchies. In some cases, a dimension can be a sub-dimension, or a super-dimension, of another dimension. In some cases, dimensions, or members (e.g. cells) in a dimension, can be aggregated, either implicitly or explicitly, based on the hierarchy. For example, lower-level members can be aggregated to form a sum (or other calculation) for a higher-level member.

A datacube can have instance data for such a data model or schema. The instance data of a datacube can be stored in one or more cells. Generally, a single datum of the datacube is stored in a single cell. However, in some cases, multiple data can be stored in a single cell.

FIGS. 6A-E illustrate an example datacube having at least four dimensions, "Region," "Time," "Quarter," and "Sub-Region" (shown by arrows beside the Region values). The dimensions can be arranged into two hierarchies, with "Quarter" as a sub-dimension of "Time" and "Sub-Region" as a sub-dimension of "Region."

Example 10—Example Cell

In any of the examples herein, a cell can be a data member or field of a datacube. A cell can be defined by particular values of the dimensions that define the datacube of which the cell is a part, or by a subset of the dimensions that define the datacube. A cell can store instance data for the datacube related to the intersection of the values of the dimensions defining the cell.

In some cases, a cell may store instance data based on a formula or equation for the cell. Further, in some cases, a cell may store aggregate or compilation instance data based, at least in part on, data in related cells, such as cells for sub-dimensions. For example, based on FIGS. 6A-E, the cell for "Region 1" in "Year 1" stores the value "59,234,807" which can be an aggregate value from the cells for the various quarters (sub-dimensions) of "Year 1," or an aggregate value from the cells for the various sub-regions (sub-dimensions) of "Region 1," or both.

In some embodiments, a cell can be a member of a dimension of a datacube. For example, a datacube may have three dimensions: A (account dimension), B (time dimension), C (location dimension). A member context can list, for each dimension, the members of that dimension: A:{a01}, B:{b02, b03}, C:{c01, c02, c03}. Thus, a01 may stand for "Units Sold" for the account dimension, b01 may stand for the year 2018 and b02 may stand for the year 2019 for the time dimension, and c01-c03 may each stand for a separate country for the location dimension. A member context may be a "coordinate" of a cell in the datacube, such as the value of the units sold in each year in each country.

Example 11—Example Constraint

In any of the examples herein, a constraint can be a rule, restriction, limitation, or other definition or factor for determining a value in a cell, or a set of cells related by the constraint. A constraint can be embodied as a function or method for controlling a value in a cell, and can be applied to a cell in addition to other factors for determining the value of a cell, such as a formula or a value entered directly for a cell.

Constraints can be configured, such as by a user, to apply to one or more cells in a datacube, as described herein. Constraints associated with a cell or set of cells can be persisted, and so automatically applied to its cells when data for the cells may change.

A constraint can include a constraint type and a set of cells. A constraint can include a set of cell alias member contexts in some cases (e.g. "sum equals" 2 or more, "constant" one or more, "constant ratio" exactly two, and the like). A constraint can be stored with the metadata of a data model (such as for the datacube). An example constraint as stored is:

```
{ constraint: "sum equals",
  cells: [
    {
      A:[a01],
      B:[b02],
      C:[c01]
    },
    {
      A:[a01],
      B:[b02],
      C:[c02]
    },
    {
      A:[a01],
      B:[b02],
      C:[c03]
    }
  ]}
```

Based on the example above provided in Example 10, this example constraint can be interpreted as the sum of units sold in 2019 for the three countries that cannot change. The actual sum need not be stored, but can be calculated and used when the constraint is instantiated or executed (e.g. solved or satisfied). The constraint can then be applied when the number of units sold of one of the countries, for 2019, is changed.

Example 12—Example Constraint Categories

In any of the examples herein, a constraint can be categorized as a configured constraint, a data model constraint, or a default constraint.

A configured constraint can be a constraint selected and associated with one or more cells in a datacube. Generally, the association between a configured constraint and one or more cells can be configured by a user, and can thus be a user-configured constraint. Additionally or alternatively, a configured constraint can be configured by another system or process. Generally, a configured constraint has an explicit association between the constraint and the associated one or more cells, which can be stored with the cells, the constraint, a context for the cells or datacube, or the like.

A data model constraint can be a constraint specified, either explicitly or implicitly, by a data model for the datacube. A data model can define a relationship between two or more dimensions of a datacube, which can indicate a constraint between cells defined in part by those dimensions based on the relationship between the dimensions. For example, a relationship between a "Year" dimension and a "Quarters" dimension (such as indicated in FIGS. 6A-E) can be defined as each year has four quarters. A data model constraint can identify the relationship between data members or cells in an instance of a data model, and can enforce the relationship between the data members or cells when applied or otherwise executed. A data model constraint can thus be that the sum of the quarters for a year cannot exceed the total for the year, or, alternatively, that the year must equal the sum of the quarters for that year. Such a data model constraint can be explicitly defined and stored, such as in a context, for datacubes based on the data model, or can be implicit to the data model, and applied as a constraint based on the data model.

A default constraint can be a constraint available in a data analytics system or data editor, that can be applied to cells without being explicitly associated with the cells. Default constraint can be used to refine updated cell value results, such as to find a single solution to possible updated cell values when multiple updated cell value results are possible. For example, a default constraint can be to keep manually entered (e.g. by a user via a user interface) cell values and thus only alter cell values that were not manually entered. Another example default constraint can be to not change the value of cells currently with the value of zero (e.g. keep zeroes). A default constraint (or multiple default constraints) can be executed or applied to a set of possible values determined by a configured constraint, or a data model constraint, or combinations thereof, to determine a single outcome value, or at least a smaller set of possible values.

Data model constraints and default constraints can be applied to cells, such as by a constraint solver, without explicit association with the cells to which they are being applied. Further, data model constraints or default constraints can, in some cases, also be treated as configured constraints, and thus can be associated with one or more cells similar to a configured constraint.

Example 13—Example Constraint Types and Functions

In any of the examples herein, a constraint can have a type, which can indicate the function of the constraint. A constraint type can be an identifier for a constraint function, which can be used to invoke the functionality of the constraint in some embodiments.

A constraint can be a "Keep Value" type. A Keep Value constraint can maintain the current value of the cells to which the constraint is associated.

A constraint can be a "Keep Ratio" type. A Keep Ratio constraint can keep the current ratio, or in some embodiments a specified ratio, between two or more cells.

A constraint can be a "Keep Sum" type. A Keep Sum constraint can keep the total value of the associated cells to the current, or in some embodiments a specified, total value.

A constraint can be a "Keep Average" type. A Keep Average constraint can keep the average value of the associated cells to the current, or in some embodiments a specified, average value.

A constraint can be a "Keep As Minimum" type, or "Keep Min." A Keep Min. constraint can maintain the current value of the cell, or in some embodiments a specified value, as the minimum possible value for the associated cell.

A constraint can be a "Keep As Maximum" type, or "Keep Max." A Keep Max. constraint can maintain the current value of the cell, or in some embodiments a specified value, as the maximum possible value for the associated cell.

The constraint persistence, constraint association, and constraint execution functionality as described herein can be performed in conjunction with other constraint types and constraint functions.

Example 14—Example Constraint Menu

In any of the examples herein, a constraint menu can include a list or other delineation of available constraint types. A constraint menu can be a visual display of the list of available constraint types, or can be a programmatic return set of values identifying the available constraint types (e.g. a tokenized data string listing the available types). In some cases, a constraint menu can be a context menu, which can be displayed in a location related to a cell selection or a cursor or other system focus. For example, a right-click on a mouse positioned near a selection of cells may invoke a context menu near the selection of cells (e.g. where the click occurred). In some embodiments, the context constraint menu, when invoked, can appear near the selected cells without overlapping or otherwise hiding the selected cells. In some cases, a keyboard command or other input command may invoke a context constraint menu based on the cell selections (e.g. the menu appears from a side or corner of the cell selection). Thus, a context constraint menu may appear in place with the cells selected for the constraint. A constraint menu can be a top-level menu, or can be a sub-menu, accessed through one or more higher level menus.

In some embodiments, a constraint menu can include an option to clear a selected constraint, or one or more constraints from selected cells, or all constraints in the datacube or in a context.

Example 15—Example Context

In any of the examples herein, a context can be a data set or data structure layer (e.g. a metalayer) associating or otherwise relating multiple cells or other data artifacts in a datacube. For example, a context can be a member context relating multiple data members or cells via the member context, which can include constraints associated with the cells in the context. In some cases, a context can include zero or one data artifact. A context can include one or more constraints, which can be triggered for execution via the context. In some cases, a context can be an operational context for the datacube, or a portion of the datacube.

Example 16—Example Constraint Triggers

In any of the examples herein, a constraint trigger can indicate or initiate execution of one or more constraints. A constraint trigger can include a change to a cell, such as a cell associated with a constraint, or a change to a minimum number of cells (e.g. refresh after three cells changed). A change to a value in a cell can be made to the cell directly, or indirectly, such as through a dialog box, via another cell, or a data entry form. A constraint trigger can include a refresh indicator, such as an input command (e.g. a menu selection or keyboard command) to refresh the datacube. A refresh indicator can also include a change to a cell, or other alteration to a datacube which can result in changes to one or more cells (e.g. a refresh indicator can automatically be triggered when a change to a datacube is made or received). A constraint trigger can include receipt of new or additional data in the datacube, such as updated data from a data source.

A constraint trigger can include direct activation of a constraint, such as by selecting a menu option to execute constraints associated with a selected cell, or to execute a selected constraint.

A constraint trigger can include a planning operation, which can direct value changes in a cell or multiple value changes. In such cases, constraint evaluation can result in rejection or execution of the planning operation.

A constraint trigger can include activation or triggering of a context of which one or more constraints is a member. Triggering or activating the context can thus include triggering or activating member or otherwise associated constraints.

Generally, a constraint trigger can be an alteration of the datacube such that recalculation of a constraint or cells associated with a constraint can result in new values for the cells.

Example 17—Example Constraint Solver

In any of the examples herein, a constraint solver can receive and process variables and functions, which can include cells and constraints. Cells can be technically addressed using member contexts, and can be represented as a variable in the constraint solver (e.g. A1, A2, B1, and so on). Such variable names can be mapped to the cells, such as via the cells' alias member contexts. The solution values in the variables, provided by the constraint solver, can then be mapped to the cells. A constraint solver can receive input such as:
A1=100
A2=A3
A4=A1+A2+A3
A4=500
where A1=0, A2=250 and A3=250, and the constraint is to keep the sum (which is currently 500). The constraint solver may be invoked or triggered when the cell represented by A1 is updated, such as to the value 100. The constraint solver then determines the correct values based on the constraint, which are:
A1=100 (as input)
A2=200
A3=200
A4=500 (indicating the constraint is satisfied). These values can then be mapped back to their cells. If no solution is calculated by the constraint solver, the data entry can be rejected. If there are multiple solutions, the constraint solver can add additional constraints, such as data model constraints or default constraints, until a unique solution is calculated or no further constraints are available, as described herein.

Example 18—Example Multiple Solution Constraint Solving

In any of the examples herein, solving constraints can result in multiple solutions for the values of the cells affected by the constraints.

Constraint execution, such as by a constraint solver, can include functionality to add data model constraints or default constraints (or both) until a single solution is achieved. The available additional constraints can have a hierarchy for addition to assist in calculating a single solution. For example, three default constraints A, B, and C may have a hierarchy of B, then C, then A. A constraint solver may add default constraint B first, then add default constraint C if a single solution isn't achieved with B, then add default constraint A if a single solution isn't achieved with B and C, based on the hierarchy.

Similarly for data model constraints, data model constraints may be applied based on a hierarchy between the constraints. In some cases, the hierarchy for data model constraints can be based on the data model itself. For example, the data model constraint hierarchy can be based on a hierarchy between dimensions in a data model.

For example, as seen in FIG. 6D, cell 609 can be changed to 30,000, and the associated constraint 607 thus necessitates changes to cells 612 from 60,000 each to maintain the sum total of 120,000. There are several possible solutions, such as 45,000 and 45,000, or 40,000 and 50,000, or 35,000 and 55,000, and so on. A default constraint to keep the ratio between current values can be added, which means that the cells 612 should have the same value (as they already had the same value at 60,000). Thus, a single solution is achieved: the cells 612 being updated to have values 45,000 each. This assumes an additional default or data model constraint that the other associated cell for Q1 should maintain its value of zero (because it is zero).

In some cases, additional constraints may be insufficient to achieve a single solution. In such cases, additional heuristics can be employed to select a solution, or other choice or selection process. In some cases, the first solution calculated could be provided.

Example 19—Example Constraint Solving Cascade

In any of the examples herein, solving constraints can cause an execution of the constraints to cascade to additional cells or dimensions not directly associated with constraints. For example, a cell, to which an associated constraint is being applied, may be related to one or more additional cells. Thus, calculating an updated value for the cell based on the constraint may cause its related cells to also have updated values, which may invoke those cells' associated constraints, and so on. Cells may be related through the data model, such as one cell being an aggregate of cells in a sub-dimension, or through a formula for a cell, such as calculating the value with an equation that uses values from other cells.

In general, part of execution of constraints (e.g. constraint solving) can include identifying or detecting all cascading cells and their associated constraints (and their associated cells and so on) to include in the calculation of the updated cell values. For example, all cells involved can be identified, including all cells to which the constraints can cascade, and then provided to a constraint solver as a single set of formulas (e.g. as a serialization) for solving.

Example 20—Constraint Solver Module Environments

Figure 7A:
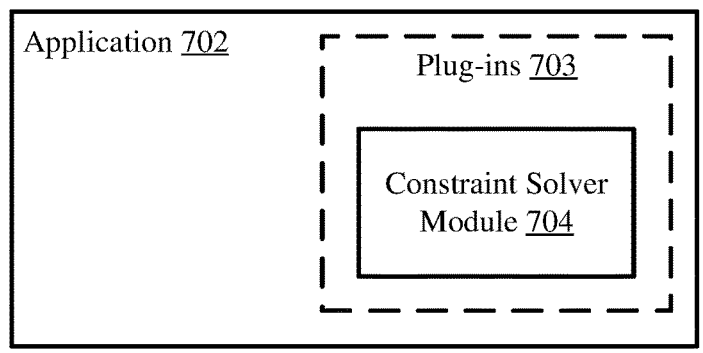
FIG. 7A is an exemplary application environment for a constraint solver module.

FIG. 7A is a schematic diagram depicting an application environment for a constraint solver module 704, which may provide constraint association and constraint solving functionality as described herein. An application 702, such as a software application running in a computing environment, may have one or more plug-ins 703 (or add-ins or other software extensions to programs) that add functionality to, or otherwise enhance, the application. The constraint solver module 704 may be integrated with the application 702; for example, the constraint solver module may be integrated as a plug-in. The constraint solver module 704 may add functionality to the application 702 for constraint association and constraint solving, which may be displayed in a user interface or otherwise provided to a user. For example, the application 702 may be an enterprise resource planning or a data management/analytics application, and the constraint solver module 704 may be integrated with the enterprise resource planning or a data management/analytics to provide constraint persistence, constraint association, and constraint solving functionality.

Figure 7B:
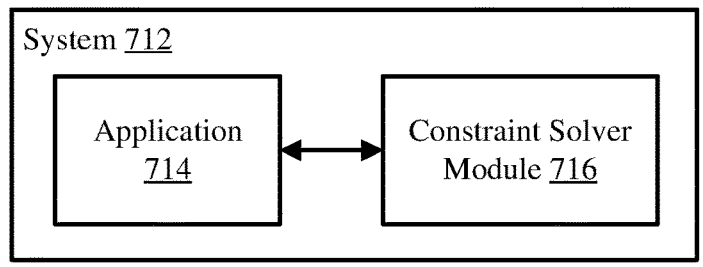
FIG. 7B is an exemplary system environment for a constraint solver module.

FIG. 7B is a schematic diagram depicting a system environment for a constraint solver module 716, which may provide constraint association and constraint solving functionality as described herein. The constraint solver module 716 may be integrated with a computer system 712. The computer system 712 may include an operating system, or otherwise be a software platform, and the constraint solver module 716 may be an application or service running in the operating system or platform, or the constraint solver module may be integrated within the operating system or platform as a service or functionality provided through the operating system or platform. The system 712 may be a server or other networked computer or file system. Additionally or alternatively, the constraint solver module 716 may communicate with and provide constraint persistence, constraint association, and constraint solving functionality, as described herein, to one or more applications 714, such as an enterprise resource planning or a data management/analytics application, in the system 712.

Figure 7C:
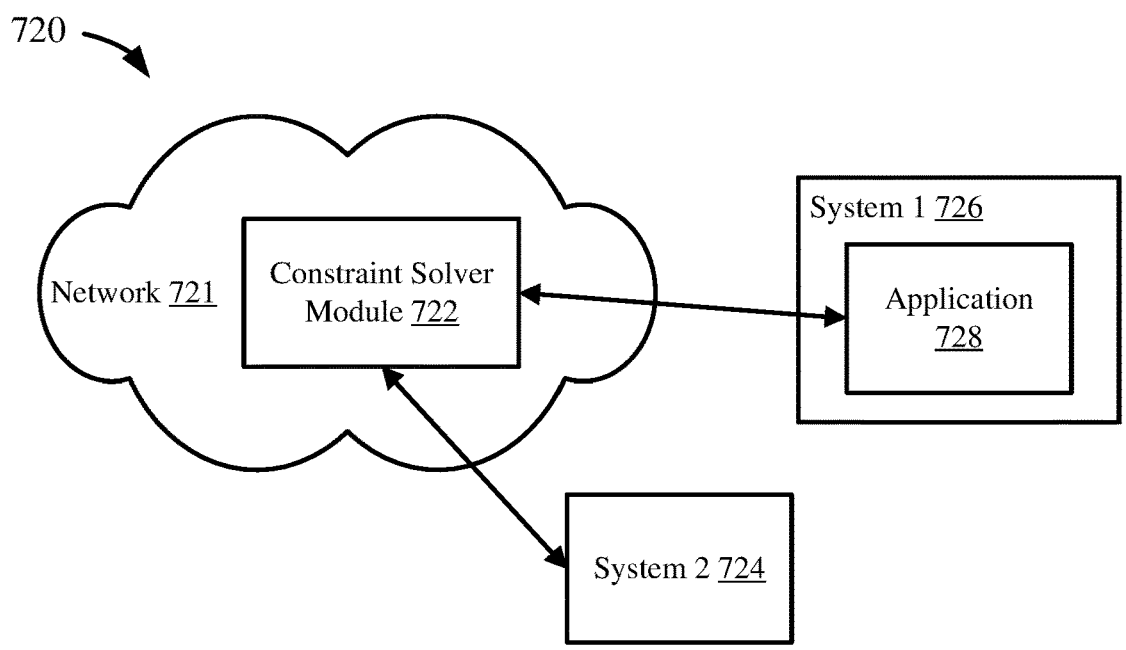
FIG. 7C is an exemplary network environment for a constraint solver module.

FIG. 7C is a schematic diagram depicting a network environment 720 for a constraint solver module 722, which may provide constraint association and constraint solving functionality as described herein. The constraint solver module 722 may be available on a network 721, or integrated with a system (such as from FIG. 7B) on a network. Such a network 721 may be a cloud network or a local network. The constraint solver module 722 may be available as a service to other systems on the network 721 or that have access to the network (e.g., may be on-demand software or SaaS). For example, system 2 724 may be part of, or have access to, the network 721, and so can utilize constraint association and constraint solving functionality from the constraint solver module 722. Additionally, system 1 726, which may be part of or have access to the network 721, may have one or more applications, such as application 728, that may utilize constraint persistence, constraint association, and constraint solving functionality from the constraint solver module 722.

In these ways, the constraint solver module 704, 716, 722 may be integrated into an application, a system, or a network, to provide constraint persistence, constraint association, and constraint solving functionality as described herein.

Example 21—Computing Systems

Figure 8:
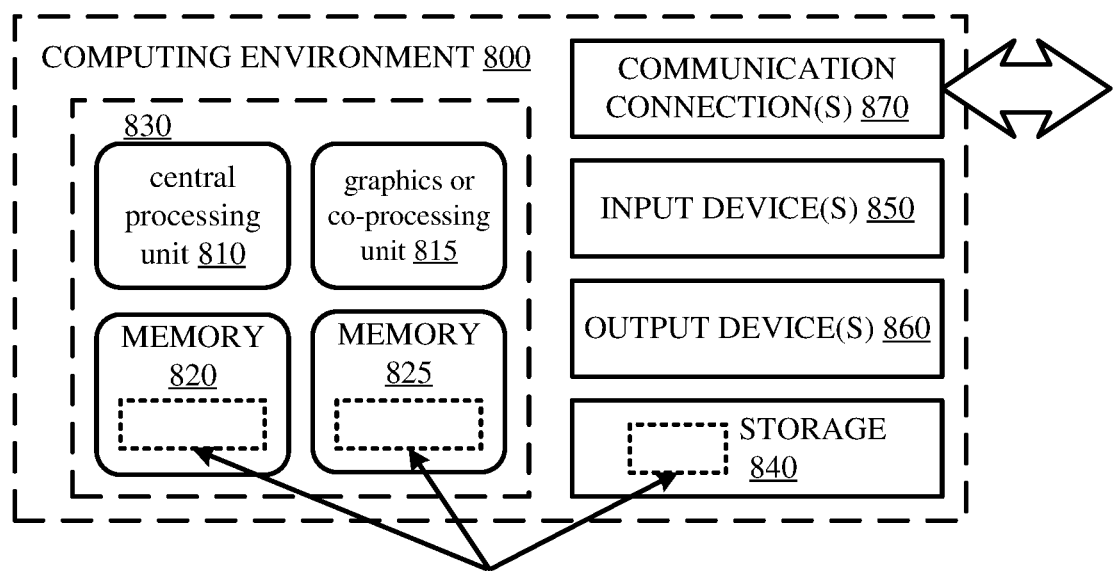
FIG. 8 is a diagram of an example computing system in which described embodiments can be implemented.

FIG. 8 depicts a generalized example of a suitable computing system 800 in which the described innovations may be implemented. The computing system 800 is not intended to suggest any limitation as to scope of use or functionality of the present disclosure, as the innovations may be implemented in diverse general-purpose or special-purpose computing systems.

With reference to FIG. 8, the computing system 800 includes one or more processing units 810, 815 and memory 820, 825. In FIG. 8, this basic configuration 830 is included within a dashed line. The processing units 810, 815 execute computer-executable instructions, such as for implementing components of the processes of FIGS. 2 and 5, the systems of FIGS. 1, 4, and 7A-C, or the data, data representations, or data structures of FIG. 3, and the displays and examples of FIGS. 6A-E. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s) 810, 815. The memory 820, 825 stores software 880 implementing one or more innovations described herein, in the form of computer-executable instructions suitable for execution by the processing unit(s) 810, 815. The memory 820, 825, may also store settings or settings characteristics, databases, data sets, interfaces, displays, or data models or representations shown in FIGS. 3 and 6A-E, the systems shown in FIGS. 1, 4, and 7A-C, or the steps of the processes shown in FIGS. 2 and 5.

A computing system 800 may have additional features. For example, the computing system 800 includes storage 840, one or more input devices 850, one or more output devices 860, and one or more communication connections 870. An interconnection mechanism (not shown) such as a bus, controller, or network interconnects the components of the computing system 800. Typically, operating system software (not shown) provides an operating environment for other software executing in the computing system 800, and coordinates activities of the components of the computing system 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing system 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing system 800. The output device(s) 860 may be a display, printer, speaker, CD-writer, or another device that provides output from the computing system 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 22—Cloud Computing Environment

Figure 9:
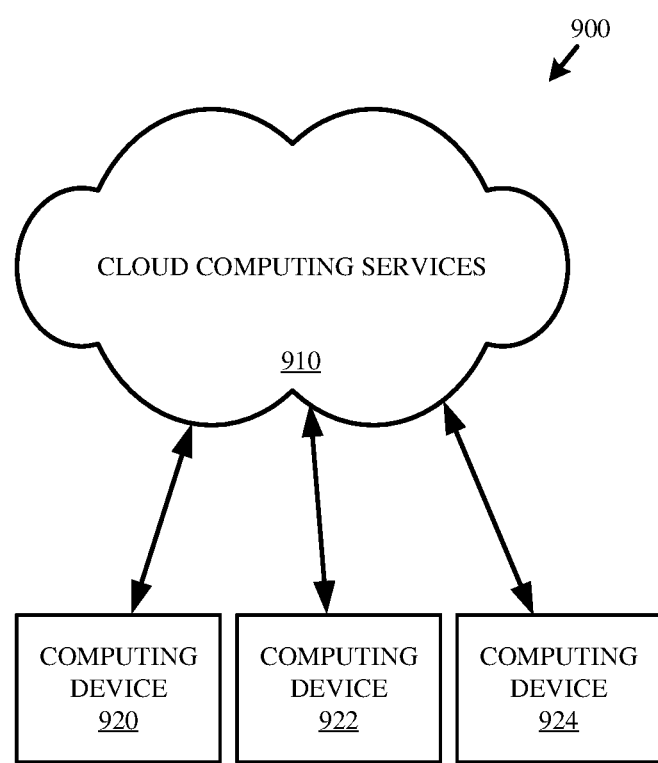
FIG. 9 is an example cloud computing environment that can be used in conjunction with the technologies described herein.

FIG. 9 depicts an example cloud computing environment 900 in which the described technologies can be implemented. The cloud computing environment 900 comprises cloud computing services 910. The cloud computing services 910 can comprise various types of cloud computing resources, such as computer servers, data storage repositories, networking resources, etc. The cloud computing services 910 can be centrally located (e.g., provided by a data center of a business or organization) or distributed (e.g., provided by various computing resources located at different locations, such as different data centers and/or located in different cities or countries).

The cloud computing services 910 are utilized by various types of computing devices (e.g., client computing devices), such as computing devices 920, 922, and 924. For example, the computing devices (e.g., 920, 922, and 924) can be computers (e.g., desktop or laptop computers), mobile devices (e.g., tablet computers or smart phones), or other types of computing devices. For example, the computing devices (e.g., 920, 922, and 924) can utilize the cloud computing services 910 to perform computing operations (e.g., data processing, data storage, and the like).

Example 23—Implementations

Although the operations of some of the disclosed methods are described in a particular, sequential order for convenient presentation, it should be understood that this manner of description encompasses rearrangement, unless a particular ordering is required by specific language set forth. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 8, computer-readable storage media include memory 820 and 825, and storage 840. The term computer-readable storage media does not include signals and carrier waves. In addition, the term computer-readable storage media does not include communication connections (e.g., 870).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. It should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

Example 24—Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, implemented by one or more computing devices comprising at least one hardware processor and one or more tangible memories coupled to the at least one hardware processor, the method comprising:
   receiving a datacube comprising a plurality of cells organized along multiple dimensions and instance data for an enterprise planning data model stored within the cells;
   generating a first display comprising at least a portion of the datacube;
   receiving a first selection of cells from the first display;
   receiving an invocation of a constraints menu within a context;
   generating a second display comprising one or more constraints in the constraints menu within the context;
   receiving a second selection of a constraint from the second display, the constraint of the second selection having a constraint type;
   generating a constraint object comprising the constraint type of the constraint of the second selection and identifiers for the cells of the first selection;
   storing the constraint object with the datacube; and
   executing one or more constraints over the cells of the first selection, the executing one or more constraints comprising changing the value of the instance data in a given cell of the cells of the first selection based on the constraint type of the constraint object having an identifier of the given cell and on a data model constraint specified by the data model, wherein the data model constraint identifies a relationship between the given cell and another cell of the cells of the first selection and enforces the relationship between the given cell and the another cell when changing the value of the instance data in the given cell and the another cell, and wherein receiving a change to one of the cells of the first selection based on the constraint type invokes the constraint type against all the cells of the first selection.

2. The method of claim 1, wherein a pointer or identifier for the constraint of the second selection is stored in a member context of the cells of the first selection.

3. The method of claim 1, wherein changing the value in the given cell is further based on a default constraint, further wherein the changed value is calculated via the default constraint from a set of possible values calculated from the constraint of the second selection.

4. The method of claim 1, wherein changing the value of the instance data in the given cell of the cells of the first selection cascades to one or more additional cells outside the cells of the first selection.

5. One or more non-transitory computer-readable storage media comprising:
   computer-executable instructions that, when executed by a computing system comprising at least one hardware processor, cause the computing system to receive a request to update a first cell of a datacube comprising a plurality of cells organized along multiple dimensions and instance data for an enterprise planning data model stored within the cells;
   computer-executable instructions that, when executed, cause the computing system to detect from the datacube a constraint object comprising a constraint type and an identifier for the first cell;
   computer-executable instructions that, when executed, cause the computing system to determine an updated value for the instance data in the first cell based on the constraint type of the constraint object and on a data model constraint specified by the data model, wherein the data model constraint identifies a relationship between the first cell and one or more other cells within the datacube and enforces the relationship between the first cell and the one or more other cells within the datacube when changing the value of the instance data in the first cell and the one or more other cells; and
   computer-executable instructions that, when executed, cause the computing system to store the updated value in the first cell.

6. The one or more non-transitory computer-readable storage media of claim 5, wherein the request to update the first cell of the datacube comprises a refresh indication for at least the first cell.

7. The one or more non-transitory computer-readable storage media of claim 5, wherein the request to update the first cell of the datacube comprises a constraint trigger, and wherein the value is updated further based on the constraint trigger.

8. The one or more non-transitory computer-readable storage media of claim 7, wherein the constraint trigger triggers the constraint via a context.

9. The one or more non-transitory computer-readable storage media of claim 5, wherein the constraint is detected via a context of the datacube.

10. The one or more non-transitory computer-readable storage media of claim 5, further comprising:
    detecting an identifier for a second cell in the constraint object;
    updating a second value in the second cell based on the value in the first cell and the constraint type of the constraint object; and
    storing the updated second value in the second cell.

11. The one or more non-transitory computer-readable storage media of claim 10, further comprising:
    detecting a second constraint associated with the second cell; and wherein updating the second value in the second cell is further based on the second constraint.

12. The one or more non-transitory computer-readable storage media of claim 11, wherein updating the value in the first cell is further based on the second constraint.

13. The one or more non-transitory computer-readable storage media of claim 5, wherein updating the value of the cell is further based on an additional data model constraint or a default constraint automatically applied to generate a single value for updating the cell.

14. A system for multidimensional datacube management, the system comprising:
   one or more memories;
   one or more processing units coupled to the one or more memories; and
   one or more computer-readable storage media storing instructions that, when loaded into the one or more memories, cause the one or more processing units to perform operations comprising:
      receiving a multidimensional datacube comprising a plurality of cells organized along multiple dimensions and instance data for an enterprise planning data model stored within the cells;
      generating a first display, the generating comprising rendering at least a portion of the multidimensional datacube;
      receiving a first change to a first cell rendered in the first display;
      detecting from the datacube a constraint object comprising a constraint type and an identifier for the first cell, wherein the constraint type identifies a constraint function;
      detecting one or more identifiers for one or more additional cells associated with in the constraint object;
      executing one or more constraints over the first cell and the one or more additional cells, the executing one or more constraints comprising calculating a first value for the first cell and one or more additional values for the respective one or more additional cells based on the constraint function identified by the constraint type and on a data model constraint specified by the data model, wherein the data model constraint identifies a relationship between the first cell and the one or more additional cells and enforces the relationship between the first cell and the one or more additional cells when changing the value of the instance data in the first cell and the one or more additional cells;
      storing the first value in the first cell; and
      storing the one or more additional values in their respective one or more additional cells.

15. The method of claim 1, further comprising, after executing the one or more constraints, indicating in the first display that the constraint of the second selection has been applied to the cells of the first selection.

16. The method of claim 1, further comprising:
   receiving a request to update a first cell of the plurality of cells;
   in response to receiving the request to update the first cell, identifying a first constraint object in the datacube comprising a constraint type and an identifier of the first cell;
   identifying one or more additional cells of the plurality of cells having an identifier stored in the first constraint object; and
   updating the first cell and the one or more additional cells subject to the constraint type of the first constraint object.

* * * * *